(12) United States Patent
Fujioka (10) Patent No.: US 9,656,520 B2
(45) Date of Patent: May 23, 2017

(54) PNEUMATIC TIRE

(71) Applicant: Toyo Tire & Rubber Co., LTD., Osaka-shi, Osaka (JP)

(72) Inventor: Tsuyoshi Fujioka, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 212 days.

(21) Appl. No.: 14/558,930

(22) Filed: Dec. 3, 2014

(65) Prior Publication Data

US 2015/0151585 A1   Jun. 4, 2015

(30) Foreign Application Priority Data

Dec. 4, 2013 (JP) ................. 2013-251013

(51) Int. Cl.
*B60C 11/03* (2006.01)
*B60C 11/12* (2006.01)

(52) U.S. Cl.
CPC ..... *B60C 11/125* (2013.04); *B60C 2011/0358* (2013.04)

(58) Field of Classification Search
CPC ........... B60C 11/125; B60C 2011/0358; B60C 11/1353; B60C 2011/1361; B60C 11/0306; B60C 2011/0341; B60C 2011/0344; B60C 2011/0346; B60C 2011/0348; B60C 2011/0355; B60C 2011/039; B60C 2011/0362; B60C 2011/0365; B60C 2011/0367; B60C 2011/0369; B60C 2011/0372
USPC ......... 152/900–902, 209.18, 209.19, 209.25, 152/209.26, 209.27, DIG. 3; D12/568–603
See application file for complete search history.

(56) References Cited

FOREIGN PATENT DOCUMENTS

| CN | 101821118 A | | 9/2010 |
|---|---|---|---|
| EP | 0 841 199 A2 | | 5/1998 |
| JP | 63-134312 A | | 6/1988 |
| JP | 5-178031 | * | 7/1993 |
| JP | 11-48717 A | | 2/1999 |
| JP | 11-78433 A | | 3/1999 |
| JP | 2000-158916 A | | 6/2000 |
| JP | 2002-29221 A | | 1/2002 |
| JP | 2003-252009 A | | 9/2003 |
| JP | 2005-14859 | * | 1/2005 |
| JP | 2009-29249 | * | 2/2009 |

OTHER PUBLICATIONS

Office Action dated Apr. 26, 2016, issued in counterpart Chinese Patent Application No. 201410532274.9. (8 pages).

* cited by examiner

*Primary Examiner* — Eric Hug
(74) *Attorney, Agent, or Firm* — Westerman, Hattori, Daniels & Adrian, LLP (57) ABSTRACT

A pneumatic tire includes a tread having a pattern formed thereon, in which the tread includes at least two main grooves extending in the tire circumferential direction; a plurality of lateral slits that are each a groove extending in a direction intersecting the tire circumferential direction formed, in at least one of ribs excluding the shoulder ribs formed in the at least two main grooves, so as to be aligned in the tire circumferential direction; and a slit bottom lateral sipe formed at the bottom of every two in the tire circumferential direction of the plurality of lateral slits aligned in the tire circumferential direction.

9 Claims, 8 Drawing Sheets

PNEUMATIC TIRE

CROSS-REFERENCE TO RELATED APPLICATION

This application claims the benefit of Japanese Patent Application No. 2013-251013, filed on Dec. 4, 2013, which is incorporated herein by reference.

BACKGROUND OF THE INVENTION

Field of the Invention

The present invention relates to a pneumatic tire used for vehicles, particularly, in applications that require frequent starting, stopping, and turning operations.

Background Art

Pneumatic tires (hereinafter, simply referred to as "tires") having various pattern structures have been proposed. For example, pattern structures disclosed in the following literatures can be mentioned.

The tire disclosed in JP S63-134312 A has a configuration in which a shallow and narrow connecting groove is provided between adjacent main grooves, and sipes are formed at the bottom of the connecting groove.

The tire disclosed in JP H11-048717 A has a configuration in which an island portion is formed by connecting two blocks.

The tires disclosed in JP 2002-029221 A and JP 2003-252009 A have a configuration in which a groove extending in the circumferential direction and a groove extending in the width direction are provided on a land area, and sipes are formed at the bottoms of the grooves.

Here, there are vehicles used in applications that require frequent starting, stopping, and turning operations on general roads (not roads between cities where high-speed running is assumed, but general roads in urban areas), such as a garbage truck. There is a demand for tires mounted on such a vehicle to reduce uneven wear and cracks in their ribs, while exerting a tractive force.

The tire disclosed in JP S63-134312 A has sipes formed in all the connecting grooves, and therefore the rigidity of blocks partitioned by the connecting grooves becomes insufficient when used as tires mounted on the vehicle in applications that require frequent starting, stopping, and turning operations on general roads. Therefore, uneven wear and cracks in the blocks may occur, which is not preferable.

Further, the tire disclosed in JP H11-048717 A has blocks that are independent from each other, and therefore the blocks easily move due to an external force. Therefore, when such tires are mounted on a vehicle used in applications that require frequent starting, stopping, and turning operations on general roads, cracks in the blocks and uneven wear in shoulder parts may possibly occur.

Further, the tires disclosed in JP 2002-029221 A and JP 2003-252009 A have all columns composed of blocks. Therefore, in the case where the blocks move due to an external force, there is no support portion. Accordingly, when such tires are mounted on a vehicle used in applications that require frequent starting, stopping, and turning operations on general roads, cracks in the blocks and uneven wear, particularly, in shoulder parts may possibly occur.

SUMMARY OF THE INVENTION

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In view of such circumferences, it is an object of the present invention to provide a pneumatic tire that is suitable, particularly, for vehicles used in applications that require frequent starting, stopping, and turning operations on general roads.

A pneumatic tire of the present invention includes a tread having a pattern formed thereon, the tread including: at least two main grooves extending in the tire circumferential direction; a plurality of lateral slits formed in at least one of ribs formed by the at least two main grooves excluding shoulder ribs, the lateral slits each being a groove extending in a direction intersecting the tire circumferential direction, and the plurality of lateral slits being formed to be aligned in the tire circumferential direction; and a slit bottom lateral sipe formed at the bottom of every two in the tire circumferential direction of the plurality of lateral slits.

Further, the configuration may be such that: the tread further includes a narrow groove extending in the tire circumferential direction in the rib in which the lateral slits are formed; the plurality of lateral slits are formed in one of regions on one side in the tire width direction of the rib in which the lateral slits are formed, with the narrow groove interposed therebetween; the plurality of lateral slits, the main grooves, and the narrow groove form a plurality of blocks aligned in the tire circumferential direction in the region on one side in the tire width direction; the plurality of lateral slits are formed in the other of the regions on the other side in the tire width direction of the rib in which the lateral slits are formed, with the narrow groove interposed therebetween; the plurality of lateral slits, the main grooves, and the narrow groove form a plurality of blocks aligned in the tire circumferential direction in the region on the other side in the tire width direction; the slit bottom lateral sipe is formed at the bottom of every two in the tire circumferential direction of the plurality of lateral slits located in at least one of the region on one side in the tire width direction and the region on the other side in the tire width direction; and the blocks located in the region on one side in the tire width direction and the blocks located in the region on the other side in the tire width direction are displaced in the tire circumferential direction from each other in the rib in which the lateral slits are formed.

Further, the configuration may be such that: the slit bottom lateral sipe is formed at the bottom of every two in the tire circumferential direction of the plurality of lateral slits located in the region on one side in the tire width direction and the region on the other side in the tire width direction of the rib in which the lateral slits are formed; the narrow groove includes a narrow groove bottom sipe that is partially formed at its bottom; and the narrow groove bottom sipe is formed to connect one slit bottom lateral sipe located in the region on one side in the tire width direction and another slit bottom lateral sipe located, at a position closest to the one slit bottom lateral sipe, in the region on the other side in the tire width direction.

Further, the narrow groove may be a groove linearly extending in the tire circumferential direction.

Further, the narrow groove may be a groove having a constant width.

Further, the lateral slits each may have a width larger than a width of the narrow groove.

Further, the configuration may be such that: the tread includes at least three main grooves extending in the tire circumferential direction; the lateral slits are formed in each of at least two of ribs formed between the at least three main grooves; and the lateral slits formed in one of the at least two of ribs extend at a different angle with respect to the tire circumferential direction from the angle at which the lateral slits formed in the other of the at least two of ribs extend.

Further, the configuration may be such that: the tread includes four main grooves extending in the tire circumferential direction, one center rib, and two intermediate ribs formed with the center rib interposed therebetween, the center rib and the intermediate ribs being formed by the four main grooves; and the lateral slits formed in the center rib have a different angle with respect to the tire circumferential direction from angles with respect to the tire circumferential direction of the lateral slits formed in the two intermediate ribs.

Further, the configuration may be such that: the tread includes at least three main grooves extending in the tire circumferential direction; and the slit bottom lateral sipe formed in one of at least two ribs formed between the at least three main grooves and the slit bottom lateral sipe formed in the other rib that is adjacent to the one rib are aligned obliquely with respect to the tire width direction.

Further, the configuration may be such that the shoulder ribs located at both ends in the tire width direction of the tread do not include grooves configured to divide the shoulder ribs in the tire circumferential direction.

BRIEF DESCRIPTION OF THE DRAWINGS

The foregoing and other features of the present invention will become apparent from the following description and drawings of an illustrative embodiment of the invention in which:

FIG. 8A shows Comparative Example 1, FIG. 8B shows Comparative Example 2, FIG. 8C shows Comparative Example 3, and FIG. 8D shows Comparative Example 4.

DETAILED DESCRIPTION OF THE PREFERRED EMBODIMENT

Next, the present invention is described with reference to a pneumatic tire according to an embodiment. As to the terms "inner side" and "outer side" that express directions in the following description, the near side to the center in the width direction of a vehicle when tires are mounted on the vehicle is mentioned as the inner side, and the away side is mentioned as the outer side.

Outline

Figure 1:
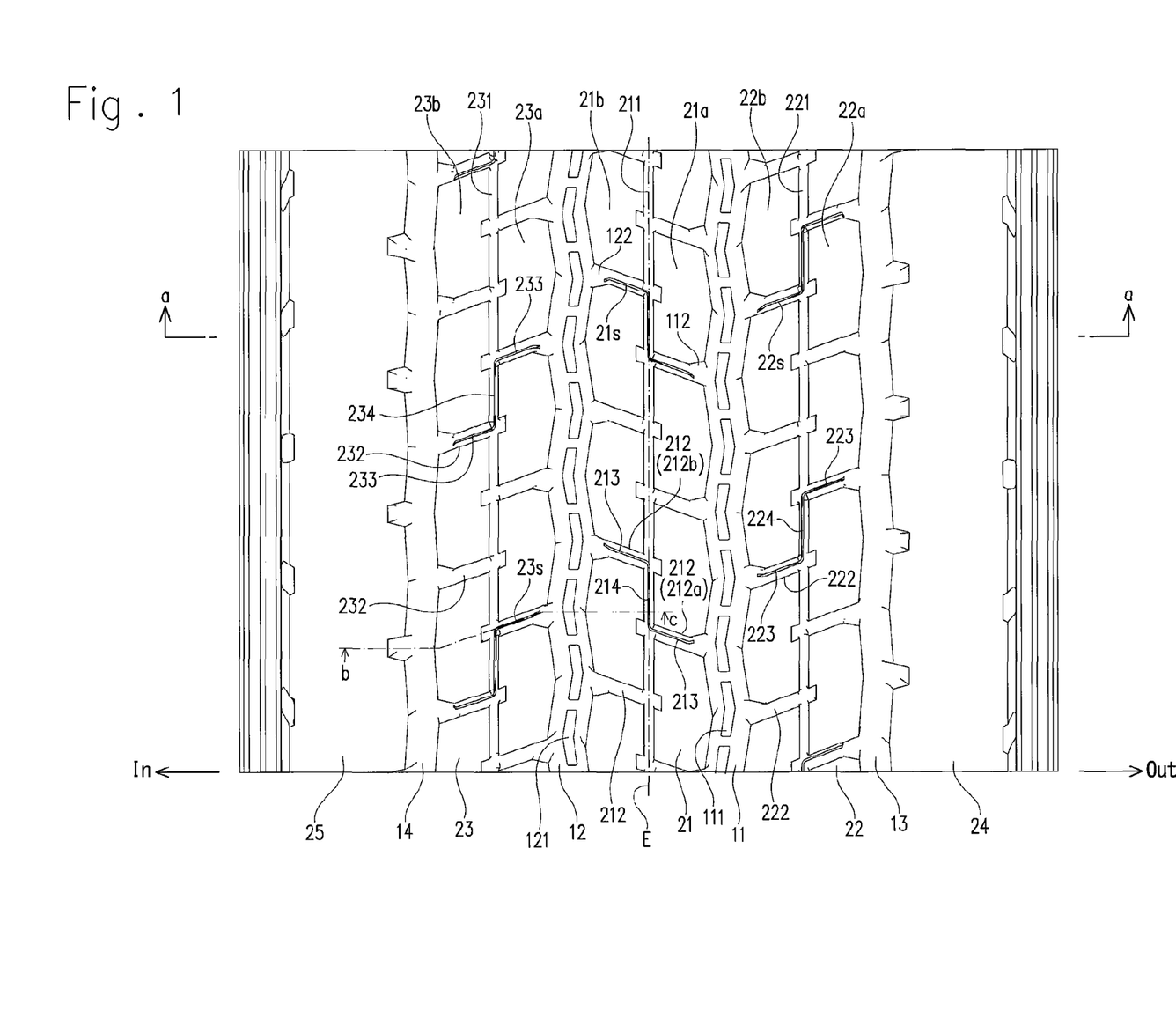
FIG. 1 is a view showing a tread pattern of a pneumatic tire according to an embodiment of the present invention, as seen in the radially outward direction thereof.
Figure 2:
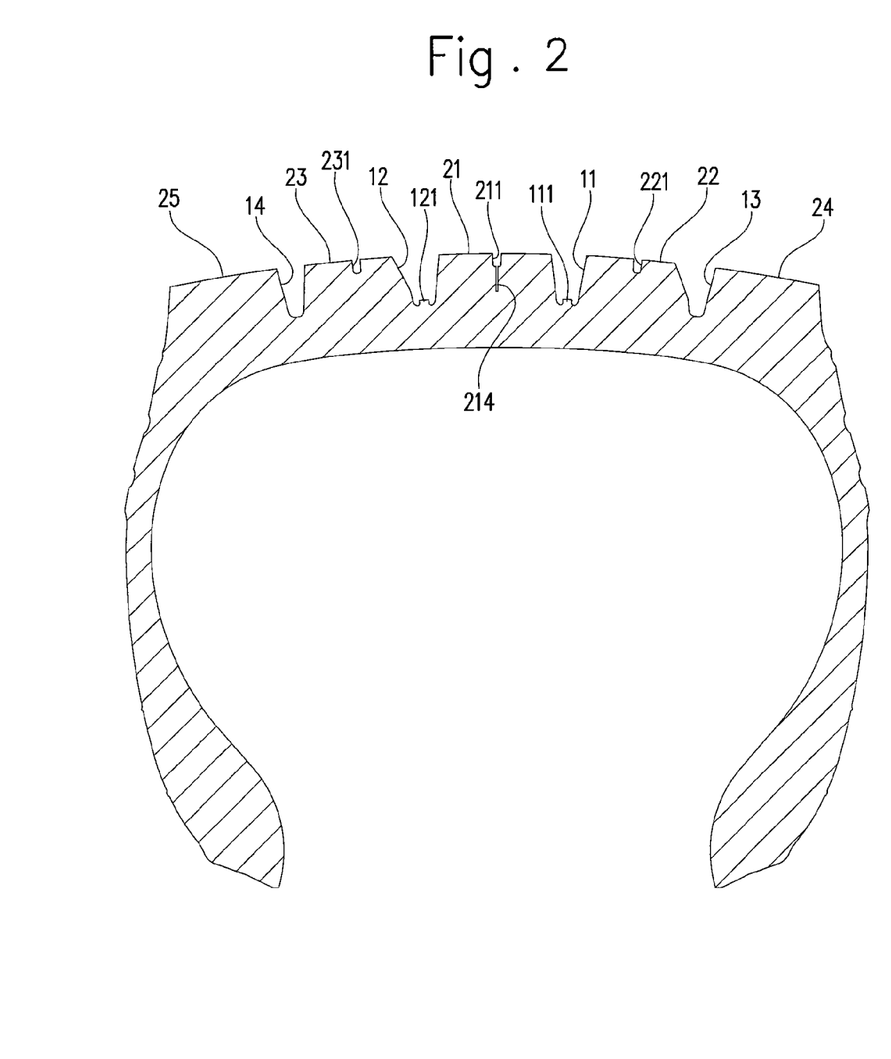
FIG. 2 is an end face view taken along the line a-a in FIG. 1.

FIG. 1 is a view showing a tread pattern of a tire of this embodiment. As shown in FIG. 1, in the state of being mounted on the vehicle, the right side in the figure is the outer side, and the left side in the figure is the inner side.

This tire has four main grooves 11 to 14 extending in the tire circumferential direction, and the tread is divided by the four main grooves 11 to 14, thereby allowing five ribs 21 to 25 to be formed as land areas extending in the tire circumferential direction. The four main grooves 11 to 14 are formed as grooves wider than other grooves formed on the tire. In this embodiment, the main grooves 11 to 14 each extend in the tire circumferential direction, not linearly, so as to be curved ("in a zigzag manner"). In this embodiment, the degree of the curve ("zigzag") is higher in the center-side main grooves 11 and 12 that are close to the tire equator E than in the shoulder-side main grooves 13 and 14 away from the tire equator E. This is because it is intended to ensure a tractive force in the region of the tread close to the tire equator E, and to reduce uneven wear when the vehicle turns around in the region thereof away from the tire equator E. Being different from this embodiment, it is also possible to form the main grooves 11 to 14 linearly.

Projections 111 and 121 are intermittently formed in the tire circumferential direction at the bottoms of the center-side outer main groove 11 and the center-side inner main groove 12. These projections 111 and 121 that basically have a known configuration as "stone ejectors" prevent stones, when the stones are trapped in the main grooves 11 and 12, from moving to the bottoms of the main grooves 11 and 12, and promote discharge of the stones from the main grooves 11 and 12. In this embodiment, stones are more likely to be trapped around a center rib 21 as compared to other ribs, and therefore the projections 111 and 121 are formed in the main grooves 11 and 12 that are formed with the center rib 21 interposed therebetween.

The height of the projections 111 and 121 in the tire radial direction from the bottoms of the respective main grooves 11 and 12 is preferably 5 to 20% of the depth of the main grooves 11 and 12. This is because, when the height is less than 5%, the effect of preventing stone entrapment decreases, whereas when it exceeds 20%, the drainage performance of the main grooves 11 and 12 is reduced, and the effect of preventing stone entrapment decreases.

It should be noted that, the number of main grooves to be formed is not limited to four, and various numbers of two or more can be employed. As the number of main grooves increases, the width per rib decreases, and therefore the drainage performance is improved.

Configuration of Center Rib

The center rib 21 is located in the region including the tire equator E of the tread. A narrow groove 211 extending in the tire circumferential direction is formed at the center in the tire width direction of the center rib 21 (which coincides with the tire equator E). The narrow groove 211 extends in a direction intersecting the direction of the lateral force acting on the tire when the vehicle turns around. Accordingly, the skidding of the center rib 21 can be reduced since the center rib 21 can resist the lateral force owing to the edge effect (reinforcement of the rib achieved by forming the groove so as to allow the end edge of the groove to resist an external force). Further, uneven wear in the center rib 21 can be also reduced.

Further, the narrow groove 211 is a linear groove having a constant width. This allows the resistance against the lateral force to be uniform in the tire circumferential direction. Further, the distance between blocks 21a and 21b, which will be described below, adjacent in the tire width direction with the narrow groove 211 interposed therebetween is allowed to be constant. Therefore, in the case where one of the blocks 21a and 21b located on one side is deformed toward the narrow groove side due to the lateral force, the one block can be stably supported by the other of the blocks 21b and 21a located on the opposite side at a certain distance therefrom with the narrow groove 211 interposed therebetween. The width dimension of the narrow groove 211 (dimension in the tire width direction) is preferably 5 to 15% of the dimension in the tire width direction of the center rib 21 (average dimension of the dimensions between the end edges on the tire equator E side of the main grooves 11 and 12). This is because, when the dimension is less than 5%, the drainage performance cannot be ensured, whereas when it exceeds 15%, the rigidity of the blocks 21a and 21b, which will be described below, is reduced, thereby causing uneven wear. Further, the depth of the narrow groove 211 is preferably 5 to 40% of the depth of each of the main grooves 11 and 12. This is because, when the depth is less than 5%, the drainage performance decreases, whereas when it exceeds 40%, the rigidity of the blocks 21a and 21b is reduced, thereby causing uneven wear.

A plurality of lateral slits 212 are formed in the center rib 21. The lateral slits 212 are each formed in a direction intersecting the tire circumferential direction. Specifically, the lateral slits 212 of this embodiment are each a groove extending linearly downward to the right as shown in FIG. 1. The plurality of lateral slits 212 are formed to be aligned in the tire circumferential direction. The plurality of blocks 21a and the plurality of blocks 21b which are respectively aligned in the tire circumferential direction are formed so as to be surrounded by the grooves of the main grooves 11 and 12, the narrow groove 211, and the lateral slits 212. It should be noted that the width of each of the lateral slits 212 is greater than the width of the narrow groove 211. Therefore, the distance between two blocks 21a (21b) with a lateral slit interposed therebetween can be greater than the distance between the blocks 21a and 21b with the narrow groove interposed therebetween. Therefore, both the tractive force due to the greater distance between the two blocks 21a (21b) with the lateral slit interposed therebetween and the resistance against the lateral force due to the smaller distance between the blocks 21a and 21b with the narrow groove interposed therebetween can be effectively achieved.

Outer lateral slits 212a formed in the outer region with respect to the narrow groove 211 and inner lateral slits 212b formed in the inner region thereof are alternately formed in the tire circumferential direction. The outer lateral slits 212a have outer ends opening into the center-side outer main groove 11, and the inner lateral slits 212b have inner ends opening into the center-side inner main groove 12.

In this way, the plurality of lateral slits 212 are alternately formed in the tire circumferential direction with the narrow groove 211 interposed therebetween, thereby allowing the lateral slits 212 not only to extend across a region on one side with respect to the narrow groove 211, but also to reach a region on the opposite side over the narrow groove 211. In the lateral slits 212 of this embodiment, the outer lateral slits 212a extend over the narrow groove 211 to reach the inner blocks 21b. The inner lateral slits 212b extend over the narrow groove 211 to reach the outer blocks 21a. In the lateral slits 212, the other ends on the opposite side of the ends opening into the main grooves 11 and 12 are closed in the region on the opposite side. Therefore, the lateral slits 212 can be formed to be longer, as compared to the configuration in which the lateral slits 212 are formed only in the regions sandwiched between the narrow groove 211 and the main groove 11 or 12. The edge effect can be increased by the increment of the length of the lateral slits 212, thereby allowing the tractive force of the center rib 21 to be improved.

The dimension in the tire width direction of the lateral slits 212 is preferably 50 to 65% of the dimension in the tire width direction of the center rib 21 (average dimension of the dimensions between the end edges on the tire equator E side of the main grooves 11 and 12). This is because, when the dimension is less than 50%, the tractive force cannot be ensured, whereas when it exceeds 65%, the rigidity of the blocks 21a and 21b is reduced, thereby causing uneven wear. Further, the depth of the lateral slits 212 is preferably 5 to 40% of the depth of the main grooves 11 and 12. This is because, when the depth is less than 5%, the drainage performance decreases, whereas when it exceeds 40%, the rigidity of the blocks 21a and 21b is reduced, thereby causing uneven wear.

Figure 3:
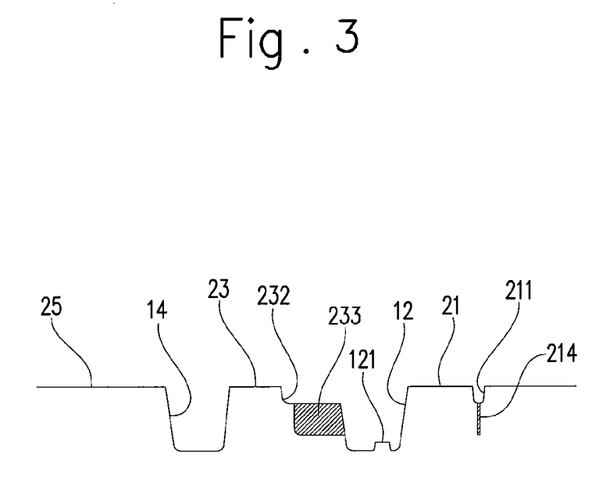
FIG. 3 shows a sectional view, taken along the line b-c in FIG. 1, of a sipe by hatching.

Further, a slit bottom lateral sipe 213 is formed at the bottom of every two of the plurality of lateral slits 212 formed in the tire circumferential direction (see an analogous sipe 233 in FIG. 3 for the cross sectional shape, for reference). It should be noted that the phrase "every two" concerns the relationship between the plurality of outer lateral slits 212a or between the plurality of inner lateral slits 212b, which are aligned in the tire circumferential direction (it does not concern the alternate relationship between the outer lateral slits 212a and the inner lateral slits 212b). The slit bottom lateral sipe 213 is continuous with a narrow groove bottom sipe 214, which will be described below. Further, as described above, the outer ends of the outer lateral slits 212a open into the center-side outer main groove 11, and the inner ends of the inner lateral slits 212b open into the center-side inner main groove 12. Therefore, slit bottom lateral sipes 213 formed in the lateral slits 212 also open into the main grooves 11 and 12 (strictly speaking, the slit bottom lateral sipes 213 open into enlarged parts 112 and 122 enlarged from the main grooves 11 and 12 in the tire width direction, as shown in FIG. 1).

The depth of the slit bottom lateral sipes 213 (depth from the bottoms of the lateral slits 212) is preferably 20 to 60% of the depth of the main grooves 11 and 12. This is because, when the depth is less than 20%, the tractive force cannot be ensured, whereas when it exceeds 60%, the rigidity of the blocks 21a and 21b is reduced, thereby causing uneven wear.

In this way, the slit bottom lateral sipe 213 is formed at the bottom of every two in the tire circumferential direction of the lateral slits 212. Accordingly, at a point away from the tire surface (point close to the center in the tire radial direction), the center rib 21 is divided by the slit bottom lateral sipes 213 at a length L1 that corresponds to the distance formed by three adjacent lateral slits 212 (a pair of blocks 21a and 21b) in the tire circumferential direction (see FIG. 4). Therefore, the "base" of the center rib 21 is strengthened as compared to the case where the slit bottom lateral sipes 213 are formed at the bottoms of all the lateral slits 212 adjacent to each other in the tire circumferential direction (when the center rib 21 is divided at a length that corresponds to the distance between two adjacent lateral slits 212 (one of the blocks 21a and 21b)). Thus, the rigidity of the center rib 21 can be enhanced. Accordingly, uneven wear and cracks in the center rib 21 can be reduced. Further, at a point close to the tire surface, the center rib 21 is divided by the lateral slits 212 at a length L2 that corresponds to the distance between two adjacent lateral slits 212 (one of the blocks 21a and 21b) in the tire circumferential direction (see FIG. 4). Owing to the edge effect obtained by formation of the lateral slits 212, a tractive force (particularly when the vehicle starts) can be exerted.

Figure 4:
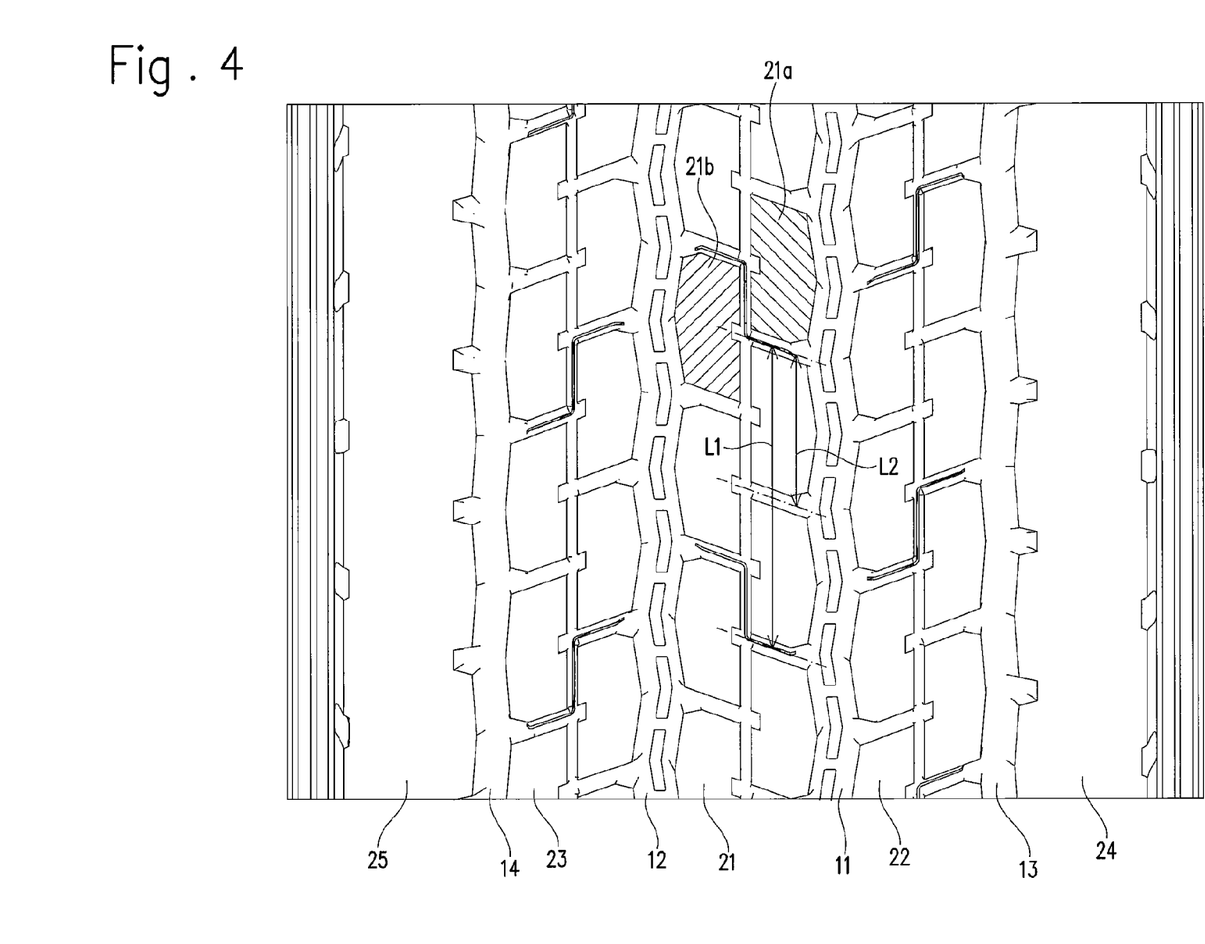
FIG. 4 shows an explanatory view illustrating the positional relationship of blocks by hatching, in addition to the contents shown in FIG. 1.

Here, consideration is given, for example, to an assumption where the lateral slits 212 are formed only at positions where the slit bottom lateral sipes 213 are formed. In this case, the distance between the lateral slits 212 is the length L1, and thus the number of the lateral slits 212 in the ground region of the center rib 21 is reduced as compared to this embodiment. Therefore, the tractive force becomes insufficient. Further, a traction feeling (appearance appeal concerning a tractive force) given to a viewer of the tire becomes insufficient as well. Therefore, the formation of the slit bottom sipe 213 at the bottom of every two lateral slits 212, as in this embodiment, makes it possible to exert a sufficient tractive force, and to impart a good traction feeling to the viewer of the tire.

As has been described above, the lateral slits 212 are alternately (without being continuous) formed with the narrow groove 211 interposed therebetween, thereby allowing the outer blocks 21a and the inner blocks 21b to be alternately aligned (displaced from each other) in the tire circumferential direction, as shown in FIG. 4 by hatching. That is, the blocks 21a and 21b adjacent to each other in the tire width direction with the narrow groove 211 interposed therebetween are displaced in the tire circumferential direction from each other. In the case where the blocks 21a and 21b coincide with each other in the tire circumferential direction, the inner blocks 21b move together with movement of the outer blocks 21a, for example, due to a lateral force. In contrast, in the case where the blocks 21a and 21b are displaced from each other, as in this embodiment, the outer blocks 21a that have moved, for example, due to a lateral force can be supported by the inner blocks 21b displaced in the tire circumferential direction. Therefore, excessive movement of the blocks 21a and 21b in the tire width direction can be reduced. Accordingly, uneven wear in the blocks 21a and 21b can be reduced.

Further, the narrow groove 211 is a groove having a constant width, as described above. Therefore, the distance between the blocks 21a and 21b that are adjacent to each other in the tire width direction with the narrow groove 211 interposed therebetween is allowed to be constant. Accordingly, for example, in the case where the outer blocks 21a are deformed toward the narrow groove 211 side due to a lateral force, they can be stably supported by the inner blocks 21b that are located on the opposite side at a constant distance with the narrow groove 211 interposed therebetween.

The narrow groove 211 has a narrow groove bottom sipe 214 that is partially formed at its bottom. The narrow groove bottom sipe 214 is formed to connect two slit bottom lateral sipes 213 that are located closest to each other with the narrow groove 211 interposed therebetween. A continuous sipe (curved sipe) 21s is formed of the two slit bottom lateral sipes 213 located on the inner side and the outer side with the narrow groove 211 interposed therebetween and the narrow groove bottom sipe 214, with one end of the narrow groove bottom sipe 214 bent outward and the other end thereof bent inward, as shown in FIG. 1.

The depth of the narrow groove bottom sipe 214 (depth from the bottom of the narrow groove 211) is preferably 20 to 60% of the depth of the main grooves 11 and 12, as in the slit bottom lateral sipes 213. This is because, when the depth is less than 20%, the skid resistance cannot be ensured, whereas when it exceeds 60%, the rigidity of the blocks 21a and 21b is reduced, thereby causing uneven wear.

Figure 5A:
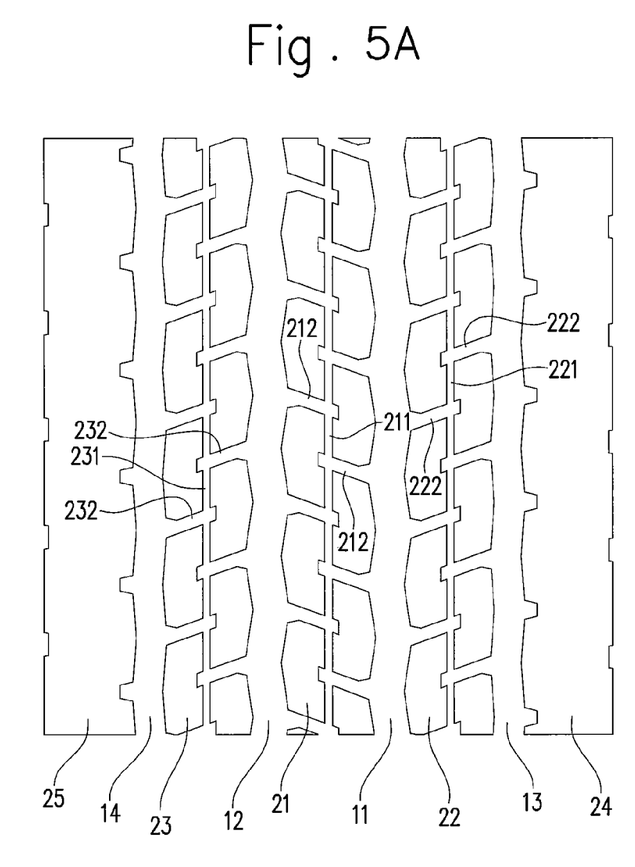
FIG. 5A is a view showing a tread pattern (only the pattern that appears on the tread surface) of a pneumatic tire according to an embodiment of the present invention in a new state.
Figure 5B:
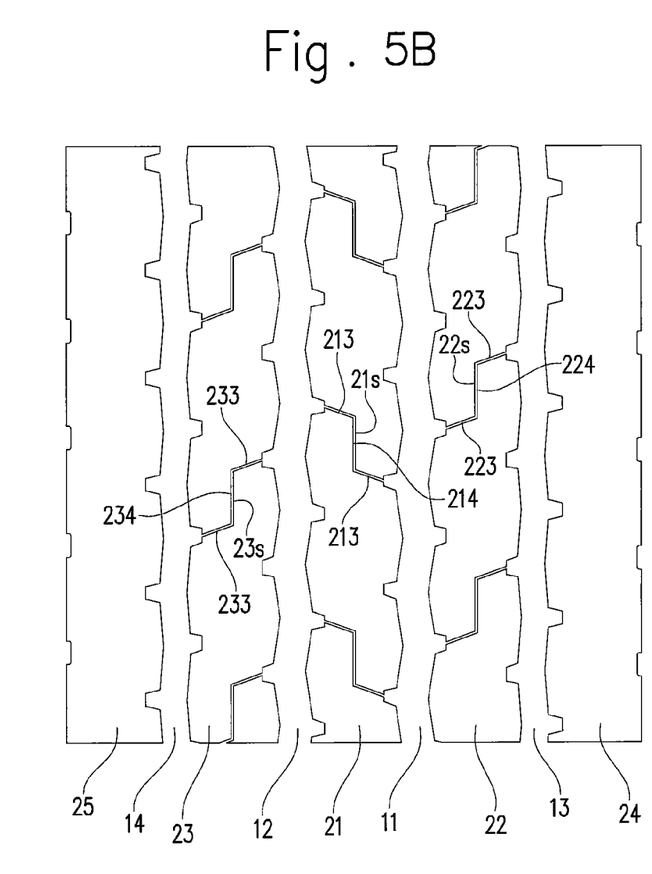
FIG. 5B is a view showing a state where wear proceeds, and narrow grooves and lateral slits have disappeared.

When the tire is new, the tire surface is in the state shown in FIG. 5A (FIG. 5A and FIG. 5B show only the pattern that appears on the tread surface). As wear proceeds by running (intermediate stage of wear), the narrow groove 211 and the lateral slits 212 disappear, as shown in FIG. 5B. In such a state, continuous sipes (curved sipes) 21s described above remain. Therefore, even after wear of the tire proceeds, the tractive force by the slit bottom lateral sipes 213 and the skid resistance by the narrow groove bottom sipe 214 can be maintained to some extent. This allows the life span of the tire to be extended.

If the narrow groove 211 and the lateral slits 212 are not formed from the new state, and only the sipes are formed instead, poor "appearance" (aesthetic appearance to be given) would be given to the viewer of the tire, and the traction feeling (appearance appeal concerning a tractive force) also would be insufficient. On the other hand, if the narrow groove 211 and the lateral slits 212 are formed to be deeper than in this embodiment from the new state, the rigidity of the center rib 21 is reduced by the increment of the depth, thereby making uneven wear and block cracks likely to occur. Therefore, when the sipes 213 and 214 are formed at the bottoms of the narrow groove 211 and the lateral slits 212, as in this embodiment (that is, grooves are formed in two steps), it is possible to give good "appearance" and good traction feeling to the viewer of the tire while maintaining the rigidity of the center rib 21.

It should be noted that the lateral slits 212 (212a and 212b) are configured to be connected to the main grooves 11 and 12 and the narrow groove 211, in this embodiment, but there is no limitation to this. For example, they may be configured as slits or grooves that are connected to neither the main grooves 11 and 12 nor the narrow groove 211 so as to have both ends closed, or as slits or grooves that are connected to only either the main grooves 11 and 12 or the narrow groove 211 so as to have one ends closed.

Configuration of Intermediate Outer Rib

In an intermediate outer rib 22, a narrow groove 221, lateral slits 222, slit bottom lateral sipes 223, narrow groove bottom sipes 224, inner blocks 22a, and outer blocks 22b are formed, as in the center rib 21. Further, continuous sipes (curved sipes) 22s are formed by the slit bottom lateral sipes 223 and the narrow groove bottom sipes 224.

Figure 6:
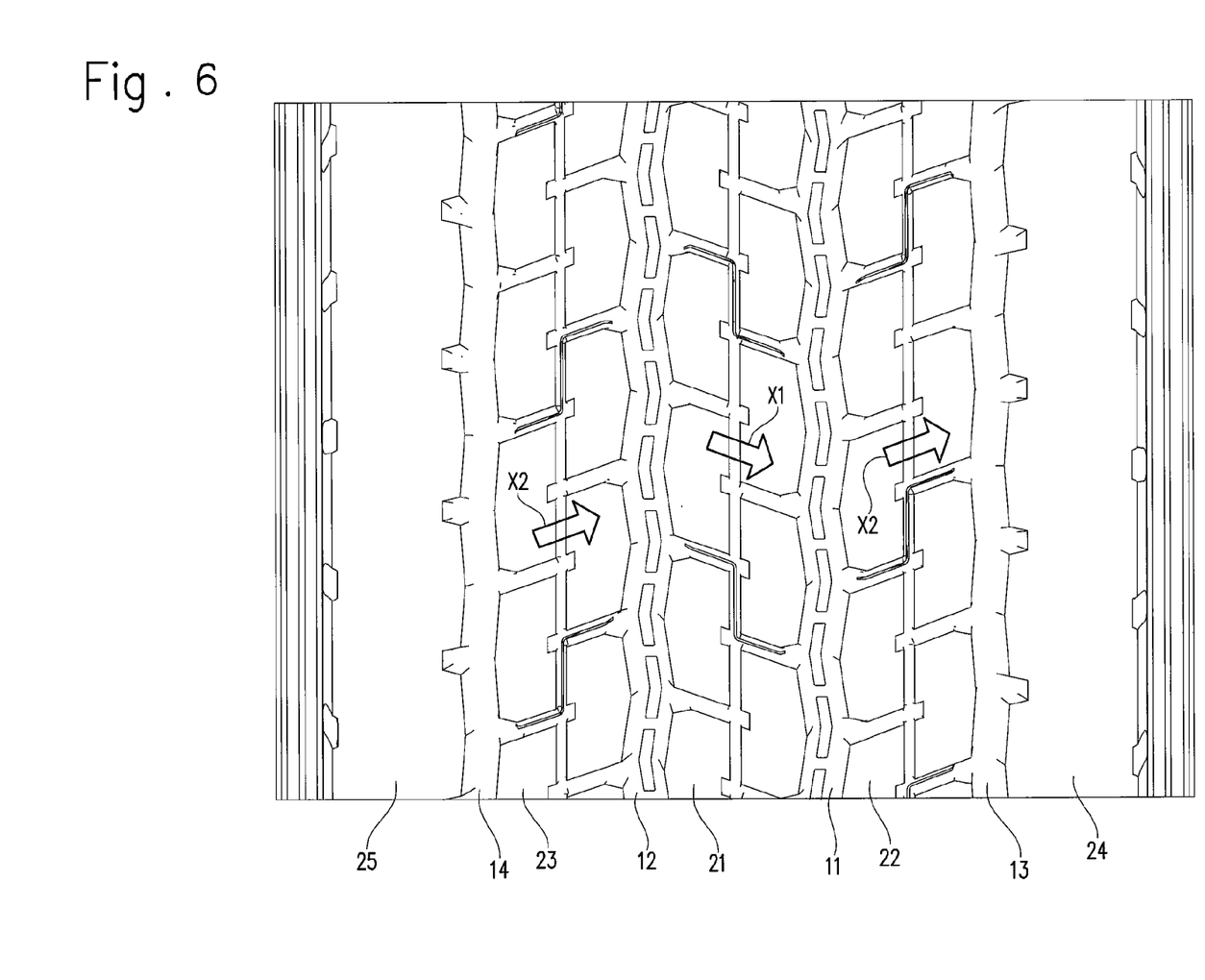
FIG. 6 is an explanatory view illustrating the extending direction of the lateral slits using arrows, in addition to the contents shown in FIG. 1.

The intermediate outer rib 22 is different from the center rib 21 (in which the extending direction of the lateral slits 212 extends downward to the right, as shown in FIG. 6 by the arrow X1) in that the extending direction (from the inner side to the outer side) of the lateral slits 222 extends upward to the right, as shown in FIG. 6 by the arrow X2. However, other grooves and blocks formed therein are configured in the same manner as in the center rib 21. Further, the lateral slits 222 are formed to be displaced in the tire circumferential direction alternately from the lateral slits 212 of the center rib 21 that are formed with the center-side outer main groove 11 interposed therebetween. Specifically, the lateral slits 222 in this embodiment are formed to be displaced by about a half pitch in the tire circumferential direction from the lateral slits 212 of the center rib 21.

Configuration of Inner Intermediate Rib

In an inner intermediate rib 23, a narrow groove 231, lateral slits 232, slit bottom lateral sipes 233, narrow groove bottom sipes 234, inner blocks 23a, and outer blocks 23b are formed, as in the center rib 21 and the intermediate outer rib 22. Further, continuous sipes (curved sipes) 23s are formed by the slit bottom lateral sipes 233 and the narrow groove bottom sipes 234.

Grooves and blocks formed in the inner intermediate rib 23 are configured in the same manner as in the intermediate outer rib 22. The extending direction (from the inner side to the outer side) of the lateral slits 232 extends upward to the right, as shown in FIG. 6 by the arrow X2, in the same manner as in the lateral slits 222 of the intermediate outer rib 22. Further, the lateral slits 232 are formed to be displaced in the tire circumferential direction alternately from the lateral slits 212 of the center rib 21 that are formed with the center-side inner main groove 12 interposed therebetween. Specifically, the lateral slits 232 in this embodiment are formed to be displaced by about a half pitch in the tire circumferential direction from the lateral slits 212 of the center rib 21.

Relationship Between Center Rib and Inner and Outer Intermediate Ribs

As shown in FIG. 6, the extending direction (from the inner side to the outer side) of the lateral slits 212 of the center rib 21 extends downward to the right (shown by the arrow X1), whereas the extending directions (from the inner side to the outer side) of the lateral slits 222 and 232 of the intermediate outer rib 22 and the inner intermediate rib 23 that are adjacent to the center rib 21 extend upward to the right (shown by the arrows X2). Accordingly, the extending direction of the lateral slits 212 of the center rib 21 is different from the extending directions of the lateral slits 222 and 232 of the intermediate outer rib 22 and the inner intermediate rib 23. In other words, the angle of the lateral slits 212 of the center rib 21 with respect to the tire circumferential direction is different from the angles of the lateral slits 222 and 232 of the intermediate outer rib 22 and the inner intermediate rib 23 with respect to the tire circumferential direction. In this way, adjacent ribs have different extending directions of the lateral slits (angle with respect to the tire circumferential direction) from each other.

In a configuration in which the lateral slits of all the ribs extend in the same direction (at the same angle with respect to the tire circumferential direction), when the direction of an external force applied to the tire coincides with the extending direction (angle with respect to the tire circumferential direction) of the lateral slits, all the ribs move in response to the external force. On the other hand, either rib that includes lateral slits having a different extending direction (angle) can resist against the external force applied to the tire in this embodiment by combining the plurality of ribs 21 to 23 configured as above. Therefore, the rib that resists against the external force can support other ribs by bracing itself, thereby suppressing excessive movement of the ribs 21 to 23. Accordingly, the pattern rigidity is ensured, and uneven wear in the ribs 21 to 23 can be reduced.

Figure 7:
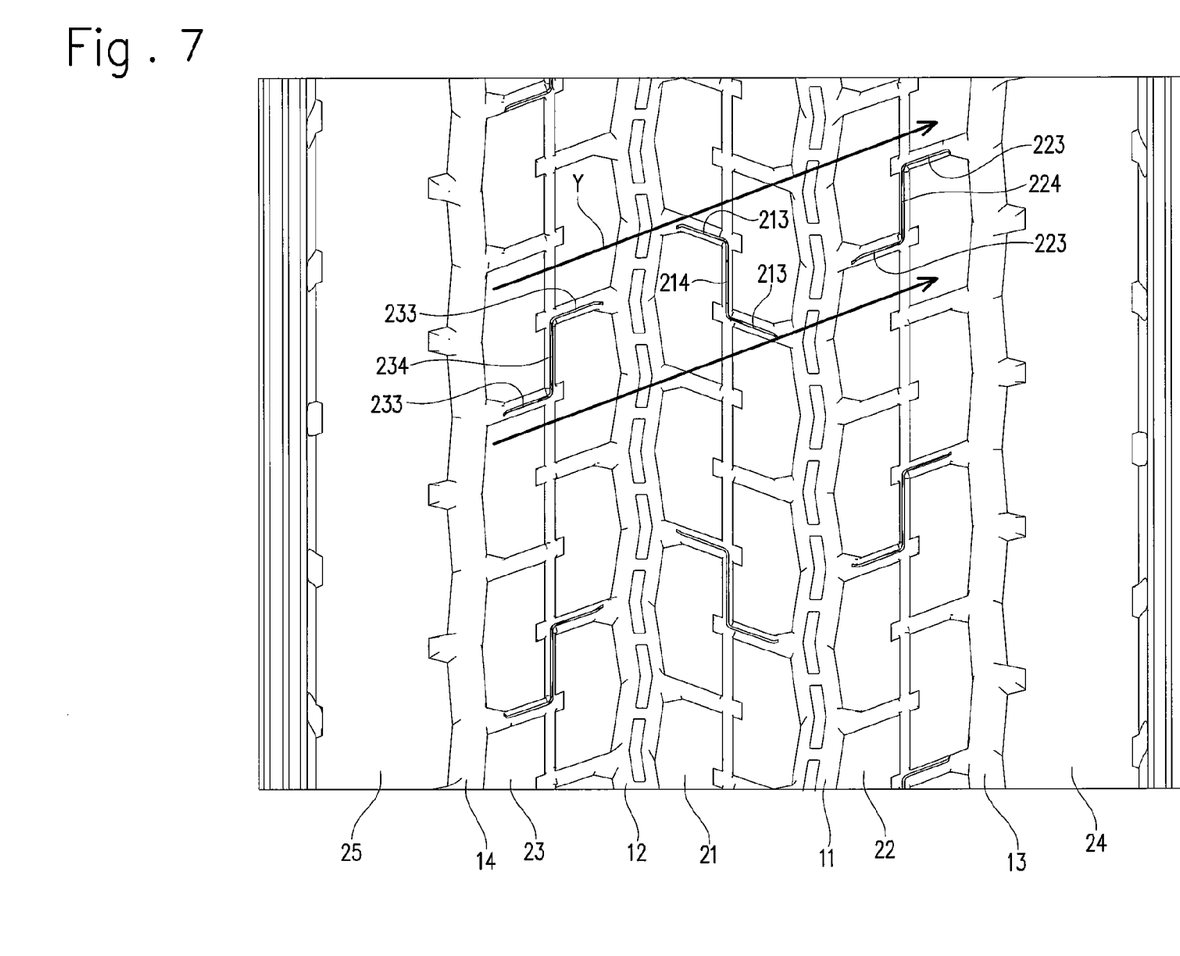
FIG. 7 is an explanatory view illustrating the positional relationship when sipes are formed using arrows, in addition to the contents shown in FIG. 1.
Figure 8A:
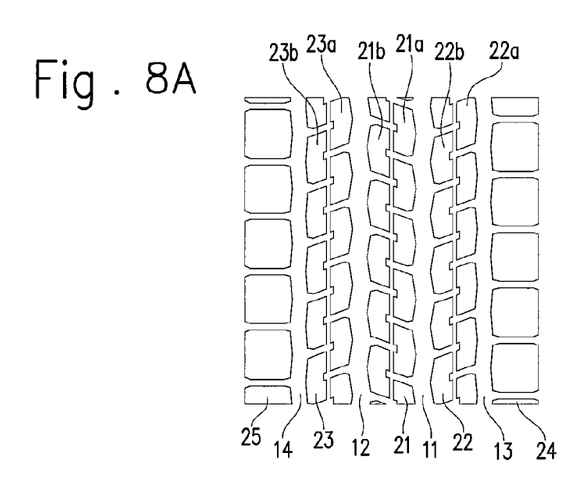
FIG. 8A to FIG. 8D each show a tread pattern (only the pattern that appears on the tread surface) of a pneumatic tire subjected to evaluation, as seen in the radially outward direction thereof, where
Figure 8B:
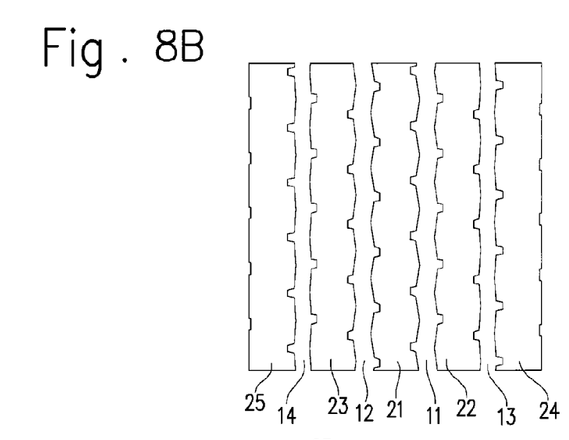
Figure 8C:
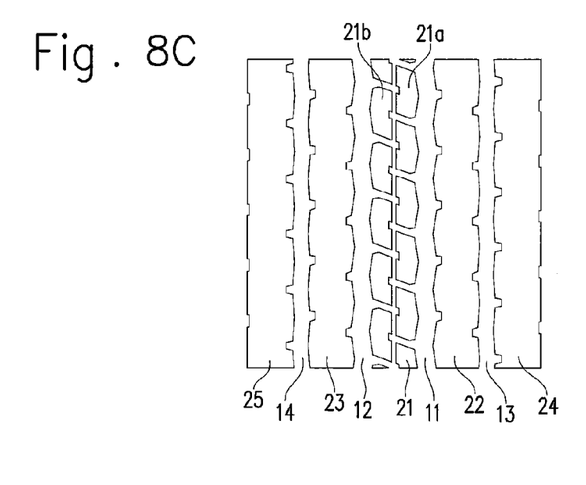
Figure 8D:
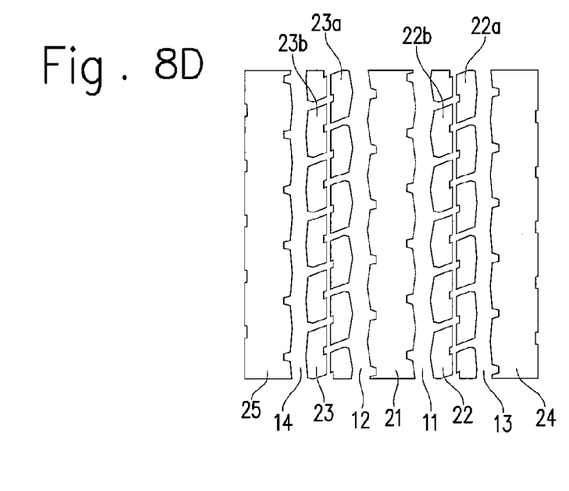

Further, the lateral slits 222 and 232 formed in the intermediate outer rib 22 and the inner intermediate rib 23 are formed to be displaced by about a half pitch in the tire circumferential direction from the lateral slits 212 of the center rib 21, respectively, in regions opposed to each other with the main grooves 11 and 12 interposed therebetween, as described above. Therefore, the continuous sipes (curved sipes) 21s to 23s of the ribs 21 to 23, that is, the slit bottom lateral sipes 213, 223, and 233 and the narrow groove bottom sipe 214, 224, and 234 are aligned obliquely (in the direction of the arrows Y shown in FIG. 7) with respect to the tire width direction.

As shown in FIG. 5B, consideration is given to the case where wear of the tire proceeds, and the narrow groove 211 and the lateral slits 212 have disappeared. In this case, the continuous sipes (curved sipes) 21s to 23s of the plurality of ribs 21 to 23 are aligned obliquely with respect to the tire width direction, and therefore the continuous sipes (curved sipes) 21s to 23s of the plurality of ribs 21 to 23 exposed on the tire surface are grounded at shifted timings, not at the same time. Accordingly, the pattern noise after the tire is worn can be reduced.

It should be noted that the lateral slits 222 and 232 of the intermediate outer rib 22 and the inner intermediate rib 23 have the same angle with respect to the tire circumferential direction as each other in this embodiment, but there is no limitation to this. The lateral slits 222 and 232 may have different angles with respect to the tire circumferential direction from each other. Further, the configuration, for example, may be such that the lateral slits 212 of the center rib 21 and the lateral slits 222 of the intermediate outer rib 22 are formed at the same angle, and the lateral slits 212 of the center rib 21 and the lateral slits 232 of the inner intermediate rib 23 are formed at different angles. That is, only two of the lateral slits 212, 222, and 232 of the plurality of ribs 21 to 23 that are not parallel to each other need to be present adjacent to each other in tire width direction.

Configuration of Shoulder Ribs

In an outer shoulder rib 24 and an inner shoulder rib 25, such lateral slits as formed in the center rib 21 and the intermediate outer rib 22 and the inner intermediate rib 23 are not formed. That is, the outer shoulder rib 24 and the inner shoulder rib 25 do not include grooves that divide the ribs 24 and 25 in the tire circumferential direction. Therefore, the rigidity of the outer shoulder rib 24 and the inner shoulder rib 25 is ensured. The ribs 24 and 25 in which the rigidity is ensured resist against the lateral force acting on the tire when the vehicle turns around. Accordingly, uneven wear in the shoulder ribs 24 and 25 can be reduced.

In this embodiment, the center rib 21 and the intermediate ribs 22 and 23 located in a region at the center in the tire width direction of the tread where the ground contact pressure is high have a block configuration in which they are divided in the tire circumferential direction, and the shoulder ribs 24 and 25 have a rib configuration in which they are not divided in the tire circumferential direction. Therefore, both the tractive force and the resistance against uneven wear when the vehicle turns around can be achieved.

Examples and Evaluation Thereof

Next, the inventors of the subject application experimentally produced tires having tread patterns shown in Table 1 and evaluated the tires. The evaluation results will be described below.

Each tire subjected to the evaluation had a size of 11R22.5. The tire was assembled with a rim (22.5×7.50) and the internal pressure thereof was set to 700 kPa. Then, such tires were mounted on a vehicle having a load capacity of 10 t that has one front and two rear axles, where two driven wheels are provided on the front side, and four driving wheels and four driven wheels are provided on the rear side, which was evaluated.

As tires subjected to the evaluation, tires having a block configuration of the center rib ("Ce" in Table 1), the intermediate inner/outer ribs ("Me" in Table 1), and the inner/outer shoulder ribs ("Sh" in Table 1) in the patterns shown in Table 1 were fabricated. The symbol "o" shown in Table 1 indicates ribs having a block configuration. Further, tires having sipes formed (or not formed) at the bottoms of the lateral slits of the center rib and the intermediate inner and outer ribs in the patterns shown in Table 1 were fabricated. Further, tires having a sipe formed in every two lateral slits ("two per pitch" in Table 1), and tires having a sipe formed in every lateral slit ("every pitch" in Table 1) were fabricated. The symbol "o" in Table 1 indicates the applied type. The tire of the present embodiment was Example 1 in Table 1. Tires of Comparative Examples 1 to 9 were subjected to the evaluation for comparison.

FIG. 8 shows only the patterns appearing on the tread surface in the tread patterns of the pneumatic tires subjected to the evaluation. FIG. 8A corresponds to Comparative Example 1, FIG. 8B corresponds to Comparative Example 2, FIG. 8C corresponds to Comparative Example 3, and FIG. 8D corresponds to Comparative Example 4. It should be noted that the reference numerals given in FIG. 8A to FIG. 8D, correspond to those of the grooves, the ribs, and the blocks that are located at the same positions in the present embodiment. Further, Comparative Example 5 was changed from Comparative Example 2 shown in FIG. 8B so that the shoulder ribs 24 and 25 had a block configuration. Comparative Example 6 was changed from Comparative Example 3 shown in FIG. 8C so that the shoulder ribs 24 and 25 had a block configuration. Comparative Example 7 was changed from Comparative Example 4 shown in FIG. 8D so that the shoulder ribs 24 and 25 had a block configuration. Comparative Example 8 and Comparative Example 9 have the same pattern appearing on the tread surface as the present embodiment (Example 1), but the pitch at which the sipe was formed was changed therefrom.

Uneven wear resistance, wetness (running properties on a wet road), and crack resistance were evaluated. For the uneven wear resistance, the state of uneven wear (wear volume at the heel and toe, wear volume in the shoulder ribs, wear volume in the center rib) in running at 20,000 km was measured and indexed. A larger index indicates a better resistance against uneven wear. For the wetness (in an initial state and in an intermediate stage of wear), the respective times required for vehicles on which new tires were mounted and for vehicles on which 50%-worn tires were mounted to run 20 m from the stopped state on a road with a water depth of 2 mm were measured and indexed. A larger index indicates a shorter arrival time to the 20 m point and a better wetness. For the crack resistance, a product of the length and depth of cracks that occurred in the tread after running was indexed and evaluated. A larger index indicates a lower occurrence of cracks and a better crack resistance.

Table 1 shows the results of each evaluation. Each index is shown by taking Comparative Example 1 as 100.

TABLE 1

| | | C. EX. 1 | C. EX. 2 | C. EX. 3 | C. EX. 4 | C. EX. 5 |
|---|---|---|---|---|---|---|
| Block Config- uration | Ce | o | — | o | — | — |
| | Me | o | — | — | o | — |
| | Sh | o | — | — | — | o |
| Slit Bottom Sipe (Ce, Me) | Two per Pitch | o | — | o | o | — |
| | Every Pitch | — | — | — | — | — |

TABLE 1-continued

| | None | — | o | — | — | o |
|---|---|---|---|---|---|---|
| Resistance Against Uneven Wear | | 100 | 101 | 105 | 103 | 93 |
| Wetness: Initial State | | 100 | 91 | 95 | 93 | 92 |
| Wetness: Intermediate Stage of Wear | | 100 | 90 | 94 | 94 | 90 |
| Resistance Against Cracks | | 100 | 109 | 103 | 107 | 107 |

| | | C. EX. 6 | C. EX. 7 | C. EX. 8 | C. EX. 9 | EX. 1 |
|---|---|---|---|---|---|---|
| Block Config- uration | Ce | o | — | o | o | o |
| | Me | — | o | o | o | o |
| | Sh | o | o | — | — | — |
| Slit Bottom Sipe (Ce, Me) | Two per Pitch | o | o | — | — | o |
| | Every Pitch | — | — | o | — | — |
| | None | — | — | — | o | — |
| Resistance Against Uneven Wear | | 97 | 94 | 109 | 107 | 108 |
| Wetness: Initial State | | 94 | 94 | 100 | 101 | 101 |
| Wetness: Intermediate Stage of Wear | | 94 | 95 | 105 | 91 | 101 |
| Resistance Against Cracks | | 102 | 104 | 94 | 105 | 102 |

It was confirmed from Table 1 that Example 1 was comprehensively superior to Comparative Examples 1 to 9. Accordingly, the advantages of the tire according to the present invention were proved.

Configuration and Action of Present Embodiment

Finally, the configuration and action caused by the configuration of the present embodiment are summarized.

According to this embodiment, a pneumatic tire includes a tread having a pattern formed thereon, the tread including: at least two main grooves (11 to 14) extending in the tire circumferential direction; a plurality of lateral slits (212, 222, and 232) formed in at least one of ribs (21 to 25) formed by the at least two main grooves (11 to 14) excluding shoulder ribs (24 and 25) (the center rib 21, the intermediate outer rib 22, and the inner intermediate rib 23), the lateral slits each being a groove extending in a direction intersecting the tire circumferential direction, and the plurality of lateral slits (212, 222, and 232) being formed to be aligned in the tire circumferential direction; and a slit bottom lateral sipe (213, 223, and 233) formed at the bottom of every two in the tire circumferential direction of the plurality of lateral slits (212, 222, and 232).

According to this configuration, the plurality of lateral slits (212, 222, and 232) each being a groove extending in a direction intersecting the tire circumferential direction are formed to be aligned in the tire circumferential direction in the at least one (21 to 23) of the ribs excluding the shoulder ribs (24 and 25), and the slit bottom lateral sipe (213, 223, and 233) is formed at the bottom of every two in the tire circumferential direction of the plurality of lateral slits (212, 222, and 232) aligned in the tire circumferential direction. Therefore, at a point away from the tire surface (point close to the center in the tire radial direction), the rib (21 to 23) is divided by the slit bottom lateral sipe (213, 223, and 233) at a length that corresponds to the distance formed by three lateral slits in the tire circumferential direction. This configuration can enhance the rigidity of the rib (21 to 23) in which the lateral slits (212, 222, and 232) are formed since the length at which the rib is divided in the tire circumferential direction is allowed to be larger than in the case where the rib is divided at the length that corresponds to the distance formed by two lateral slits. Accordingly, uneven wear in the rib (21 to 23), or cracks in the rib (21 to 23) occurring when the vehicle turns around or when it starts can be reduced. On the other hand, at a point close to the tire surface, a tractive force can be exerted by the lateral slits (212, 222, and 232). That is, a base having high rigidity can be formed by largely dividing the rib (21 to 23) at a point away from the tire surface, and a tractive force can be exerted by dividing the rib (21 to 23) into a smaller size at a point close to the tire surface, while reducing cracks in the rib (21 to 23).

Further, the configuration may be such that: the tread includes a narrow groove (211, 221, and 231) extending in the tire circumferential direction in the rib (the center rib 21, the intermediate outer rib 22, and the inner intermediate rib 23) in which the lateral slits are formed; the plurality of lateral slits (212, 222, and 232) are formed in one of regions on one side in the tire width direction of the rib (21 to 23) in which the lateral slits are formed, with the narrow groove (211, 221, and 231) interposed therebetween; the plurality of lateral slits (212, 222, and 232), the main grooves (11 to 14), and the narrow groove (211, 221, and 231) form a plurality of blocks (21a to 23a) aligned in the tire circumferential direction in the region on one side in the tire width direction; the plurality of lateral slits (212, 222, and 232) are formed in the other of the regions on the other side in the tire width direction of the rib (21 to 23) in which the lateral slits are formed, with the narrow groove (211, 221, and 231) interposed therebetween; the plurality of lateral slits (212, 222, and 232), the main grooves (11 to 14), the narrow groove (211, 221, and 231) form a plurality of blocks (21b to 23b) aligned in the tire circumferential direction in the region on the other side in the tire width direction; the slit bottom lateral sipe (213, 223, and 233) is formed at the bottom of every two in the tire circumferential direction of the plurality of lateral slits (212, 222, and 232) located in at least one of the region on one side in the tire width direction and the region on the other side in the tire width direction; and the blocks (21a to 23a) located in the region on one side in the tire width direction and the blocks (21b to 23b) located in the region on the other side in the tire width direction are displaced in the tire circumferential direction from each other in the rib (21 to 23) in which the lateral slits are formed.

According to this configuration, the narrow groove (211, 221, and 231) extending in the tire circumferential direction is provided in the rib (21 to 23) in which the lateral slits are formed. The narrow groove (211, 221, and 231) extends in a direction intersecting the direction of the lateral force acting on the tire when the vehicle turns around. Accordingly, the rib (21 to 23) can resist against the lateral force, and therefore skidding of the rib (21 to 23) can be reduced, and uneven wear in the rib (21 to 23) also can be reduced. Further, the blocks (21a to 23a) and the blocks (21b to 23b) that are adjacent to each other in the tire width direction with the narrow groove (211, 221, and 231) interposed therebetween are displaced in the tire circumferential direction from each other, in the rib (21 to 23) in which the lateral slits are formed. Therefore, the lateral slits (212, 222, and 232) can be formed so as to reach the blocks on the opposite side with the narrow groove (211, 221, and 231) interposed therebetween, in order to improve the tractive force.

Further, the configuration may be such that: the slit bottom lateral sipe (213, 223, and 233) is formed at the bottom of every two in the tire circumferential direction of the plurality of lateral slits (212, 222, and 232) located in the region on one side in the tire width direction and the region on the other side in the tire width direction of the rib (21 to 23) in which the lateral slits are formed; the narrow groove (211, 221, and 231) has a narrow groove bottom sipe (214, 224, and 234) that is partially formed at its bottom; and the narrow groove bottom sipe (214, 224, and 234) is formed to connect one slit bottom lateral sipe (213, 223, and 233) located in the region on one side in the tire width direction and another slit bottom lateral sipe (213, 223, and 233) located, at a position closest to the one slit bottom lateral sipe, in the region on the other side in the tire width direction.

According to this configuration, the narrow groove bottom sipe (214, 224, and 234) is formed to connect one slit bottom lateral sipe (213, 223, and 233) located in the region on one side in the tire width direction and another slit bottom lateral sipe (213, 223, and 233) located, at a position closest to the one slit bottom lateral sipe, in the region on the other side in the tire width direction. The narrow groove bottom sipe (214, 224, and 234) allows a continuous sipe (curved sipe) (21s to 23s) to be formed by the slit bottom lateral sipes (213, 223, and 233) and the narrow groove bottom sipe (214, 224, and 234). Therefore, after the lateral slits (212, 222, and 232) and the narrow grooves (211, 221, and 231) have disappeared as wear of the tire proceeds, such continuous sipes (curved sipes) (21s to 23s) remain. Accordingly, even after wear of the tire proceeds, the tractive force by the slit bottom lateral sipe (213, 223, and 233) can be maintained, and the skid resistance by the narrow groove bottom sipe (214, 224, and 234) can be maintained.

Further, the narrow groove (211, 221, and 231) may be a groove linearly extending in the tire circumferential direction. This configuration allows the resistance against the lateral force of the rib (21 to 23) in which the narrow groove (211, 221, and 231) is formed to be uniform in the tire circumferential direction.

Further, the narrow groove (211, 221, and 231) may be a groove having a constant width. This configuration allows the distance between the blocks (21a to 23a) and the blocks (21b to 23b) that are adjacent to each other in the tire width direction, with the narrow groove (211, 221, and 231) interposed therebetween, to be constant. Therefore, in the case where the blocks (21a to 23a) or the blocks (21b to 23b) on one side are deformed toward the narrow groove side due to the lateral force, they can be stably supported by the blocks (21b to 23b) or (21a to 23a) that are located on the opposite side at a constant distance with the narrow groove interposed therebetween.

Further, the lateral slits (212, 222, and 232) each may have a width larger than a width of the narrow groove (211, 221, and 231). This configuration allows the distance between two blocks (such as two blocks 21a) with a lateral slit interposed therebetween to be larger than the distance between a pair of the blocks (21a to 23a) and the block (21b to 23b) with a narrow groove interposed therebetween. Therefore, both the tractive force due to the greater distance between the two blocks (such as two blocks 21a) with the lateral slit interposed therebetween and the resistance against the lateral force due to the smaller distance between the pair of the block (21a to 23a) and the block (21b to 23b) with the narrow groove interposed therebetween can be effectively achieved.

Further, the configuration may be such that: the tread includes at least three main grooves (11 to 14) extending in the tire circumferential direction; the lateral slits (212, 222, and 232) are formed in each of at least two of ribs (21 to 23) formed between the at least three main grooves (11 to 14); the lateral slits (212, 222, or 232) formed in one of the at least two of ribs (21 to 23) extend at a different angles with respect to the tire circumferential direction from the angle at which the lateral slits formed in the other of the at least two ribs extend.

According to this configuration, the lateral slits (212) formed in one rib (the center rib 21) of the at least two ribs (21 to 23) extend at a different angle with respect to the tire circumferential direction from the angle at which the lateral slits formed in the other rib extend. Therefore, one of the two ribs can resist against the external force applied to the tire, and therefore excessive movement of the rib (21, 22, and 23) can be reduced. Accordingly, uneven wear in the rib (21, 22, and 23) can be reduced.

Further, the configuration may be such that: the tread includes four main grooves (11 to 14) extending in the tire circumferential direction, one center rib (21), and two intermediate ribs (22 and 23) formed with the center rib 21 interposed therebetween, the center rib (21) and the intermediate ribs (22 and 23) being formed by the four main grooves (11 to 14); and the lateral slits (212) formed in the center rib (21) have a different angle with respect to the tire circumferential direction from angles with respect to the tire circumferential direction of the lateral slits (222 and 232) formed in the two intermediate ribs (22 and 23).

According to this configuration, the lateral slits (212) formed in the center rib (21) have a different angle with respect to the tire circumferential direction from the angles with respect to the tire circumferential direction of the lateral slits (222 and 232) formed in the two intermediate ribs (22 and 23). Therefore, the center rib (21) can resist against the external force applied to the tire. Thus, even when a lateral force is applied either from one side or from the other side in the tire width direction, excessive movement of the center rib (21) and the intermediate ribs (22 and 23) can be reduced. Accordingly, uneven wear in the center rib (21) and the intermediate ribs (22 and 23) can be reduced.

Further, the configuration may be such that: the tread includes at least three main grooves (11 to 14) extending in the tire circumferential direction; the slit bottom lateral sipe (213, 223, 233) formed in one of at least two ribs (21 to 23) formed between the at least three main grooves (11 to 14) and the slit bottom lateral sipe (213, 223, 233) formed in the other rib that is adjacent to the one rib are aligned obliquely with respect to the tire width direction.

According to this configuration, the slit bottom lateral sipes (213, 223, and 233) of at least two adjacent ribs (21 and 22) or (21 and 23) are aligned obliquely with respect to the tire width direction. Therefore, the slit bottom lateral sipes (213, 223, and 233) that are exposed on the tire surface after the lateral slits (212, 222, and 232) and the narrow groove (211, 221, and 231) have disappeared as wear of the tire proceeds are grounded at shifted timings, not at the same time, in the at least two adjacent ribs (21 and 22) or (21 and 23). Accordingly, the pattern noise after the wear of the tire can be reduced.

Further, the configuration may be such that the shoulder ribs (24 and 25) located at both ends in the tire width direction of the tread do not include grooves configured to divide the shoulder ribs in the tire circumferential direction. According to this configuration, grooves configured to divide the ribs in the tire circumferential direction are not formed, thereby allowing the shoulder ribs (24 and 25) whose rigidity is ensured to resist against the lateral force acting on the tire when the vehicle turns around. Accordingly, uneven wear of the shoulder ribs 24 and 25 can be reduced.

According to the present embodiment, a base having high rigidity can be formed by largely dividing a rib at a point away from the tire surface, and a tractive force can be exerted by dividing the rib into a smaller size at a point close to the tire surface, while reducing cracks in the rib. Therefore, this embodiment is suitable, particularly, for vehicles used in applications that require frequent starting, stopping, and turning operations on general roads.

The present embodiment is as has been described above. However, the present invention is not limited to the above described embodiment, and the design can be appropriately modified within the scope intended by the present invention. The operational advantage of the present invention is also not limited to the foregoing embodiments. The embodiments disclosed herein should be construed in all respects as illustrative but not limiting. The scope of the present invention is not indicated by the foregoing description but by the scope of the claims. Further, the scope of the present invention is intended to include all the modifications equivalent in the sense and the scope to the scope of the claims.

What is claimed is:

1. A pneumatic tire, comprising:
    a tread having a pattern formed thereon, the tread including:
        at least two main grooves extending in the tire circumferential direction;
        a plurality of lateral slits formed in at least one of ribs formed by the at least two main grooves excluding shoulder ribs, the lateral slits each being a groove extending in a direction intersecting the tire circumferential direction, and the plurality of lateral slits being formed to be aligned in the tire circumferential direction; and
        a slit bottom lateral sipe formed at the bottom of every two in the tire circumferential direction of the plurality of lateral slits,
    wherein the tread further includes a narrow groove extending in the tire circumferential direction in the rib in which the lateral slits are formed;
    wherein the plurality of lateral slits are formed in one of regions on one side in the tire width direction of the rib in which the lateral slits are formed, with the narrow groove interposed therebetween;
    wherein the plurality of lateral slits, the main grooves, and the narrow groove form a plurality of blocks aligned in the tire circumferential direction in the region on one side in the tire width direction;
    wherein the plurality of lateral slits are formed in the other of the regions on the other side in the tire width direction of the rib in which the lateral slits are formed, with the narrow groove interposed therebetween;
    wherein the plurality of lateral slits, the main grooves, and the narrow groove form a plurality of blocks aligned in the tire circumferential direction in the region on the other side in the tire width direction;
    wherein the slit bottom lateral sipe is formed at the bottom of every two in the tire circumferential direction of the plurality of lateral slits located in at least one of the region on one side in the tire width direction and the region on the other side in the tire width direction; and
    wherein the blocks located in the region on one side in the tire width direction and the blocks located in the region on the other side in the tire width direction are displaced in the tire circumferential direction from each other in the rib in which the lateral slits are formed.

2. The pneumatic tire according to claim 1, wherein:
    the slit bottom lateral sipe is formed at the bottom of every two in the tire circumferential direction of the plurality of lateral slits located in the region on one side in the tire width direction and the region on the other side in the tire width direction of the rib in which the lateral slits are formed;

the narrow groove includes a narrow groove bottom sipe that is partially formed at its bottom; and the narrow groove bottom sipe is formed to connect one slit bottom lateral sipe located in the region on one side in the tire width direction and another slit bottom lateral sipe located, at a position closest to the one slit bottom lateral sipe, in the region on the other side in the tire width direction.

3. The pneumatic tire according to claim 1, wherein the narrow groove is a groove linearly extending in the tire circumferential direction.

4. The pneumatic tire according to claim 3, wherein the narrow groove is a groove having a constant width.

5. The pneumatic tire according to claim 1, wherein the lateral slits each have a width larger than a width of the narrow groove.

6. The pneumatic tire according to claim 1, wherein:

the tread includes at least three main grooves extending in the tire circumferential direction;

the lateral slits are formed in each of at least two of ribs formed between the at least three main grooves; and the lateral slits formed in one of the at least two of ribs extend at a different angle with respect to the tire circumferential direction from the angle at which the lateral slits formed in the other of the at least two of ribs extend.

7. The pneumatic tire according to claim 6, wherein:

the tread includes four main grooves extending in the tire circumferential direction, one center rib, and two intermediate ribs formed with the center rib interposed therebetween, the center rib and the intermediate ribs being formed by the four main grooves; and the lateral slits formed in the center rib have a different angle with respect to the tire circumferential direction from angles with respect to the tire circumferential direction of the lateral slits formed in the two intermediate ribs.

8. The pneumatic tire according to claim 1, wherein:

the tread includes at least three main grooves extending in the tire circumferential direction;

the slit bottom lateral sipe formed in one of at least two ribs formed between the at least three main grooves and the slit bottom lateral sipe formed in the other rib that is adjacent to the one rib are aligned obliquely with respect to the tire width direction.

9. The pneumatic tire according to claim 1, wherein the shoulder ribs located at both ends in the tire width direction of the tread do not include grooves configured to divide the shoulder ribs in the tire circumferential direction.

* * * * *